United States Patent

[11] 3,607,558

[72] Inventor Noel Nebout
    Montluçon Allier, France
[21] Appl. No. 621,855
[22] Filed Mar. 9, 1967
[45] Patented Sept. 21, 1971
[73] Assignee The Dunlop Company Limited
    London, England
[32] Priority Mar. 11, 1966
[33] France
[31] 53,139

[54] TIRE BUILDING FORMER HAVING CYLINDRICAL AND TOROIDAL CONFIGURATIONS
16 Claims, 20 Drawing Figs.

[52] U.S. Cl............................................ 156/415, 156/417
[51] Int. Cl.............................................B29h17/06, B29h 17/16, B29h 17/26
[50] Field of Search............................. 156/414, 415, 417, 420

[56] References Cited
UNITED STATES PATENTS

| | | | |
|---|---|---|---|
| 1,749,922 | 3/1930 | Palmer........................ | 156/417 |
| 3,278,362 | 10/1966 | Johannes...................... | 156/415 |
| 3,405,023 | 10/1968 | Eckenniler et al............. | 156/415 |
| 3,409,490 | 11/1968 | Pacciarini et al............. | 156/415 |
| 3,485,692 | 12/1969 | Frazier........................ | 156/415 X |
| 3,433,695 | 3/1969 | Caretta et al................. | 156/415 |

FOREIGN PATENTS

| | | | |
|---|---|---|---|
| 21,081 | 2/1900 | Switzerland.................. | 156/420 |

Primary Examiner—Benjamin A. Borchelt
Assistant Examiner—Stephen C. Bentley
Attorney—Rauber & Lazar ABSTRACT: A tire-building former having radially and axially movable supporting elements to provide a tire-building surface which is rigid in both cylindrical and toroidal configurations of the former specifically to facilitate the building of radial-ply tires.

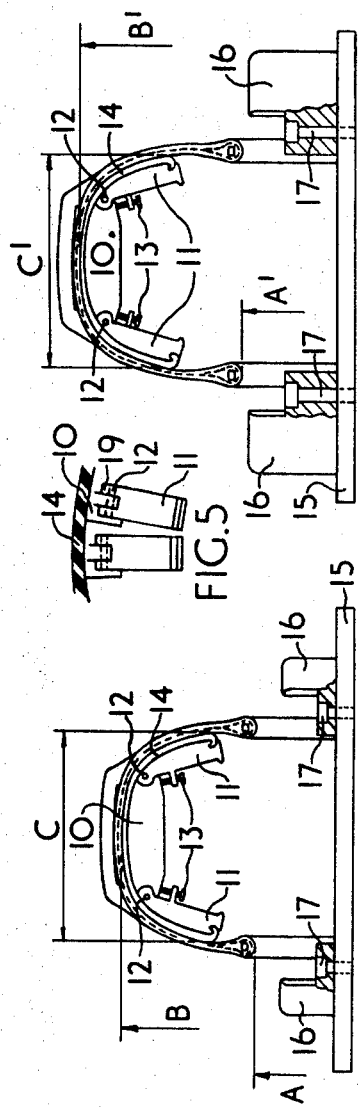

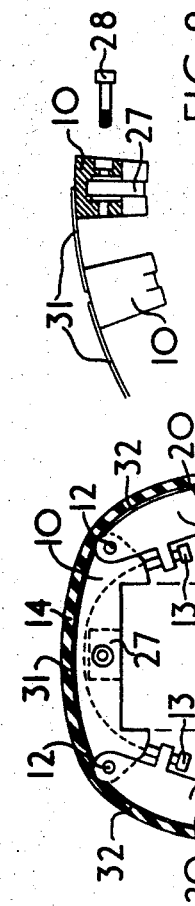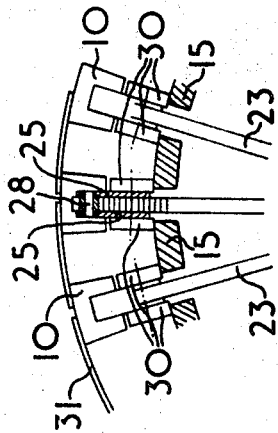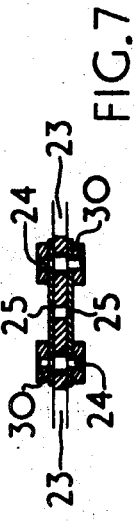

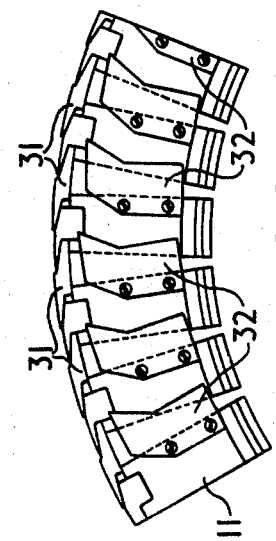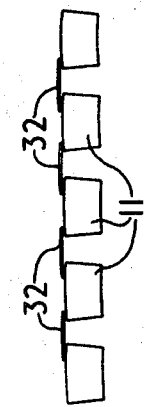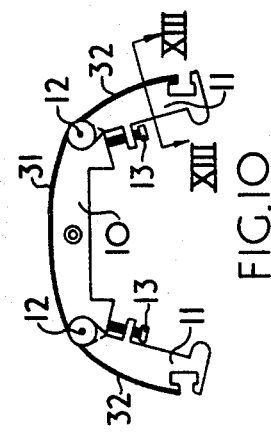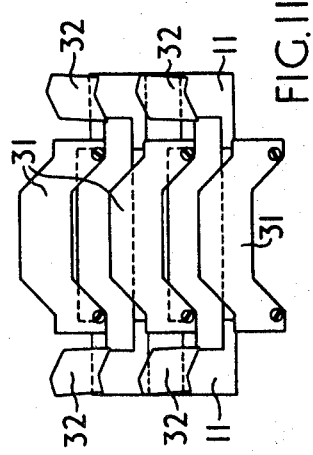

3,607,558

TIRE BUILDING FORMER HAVING CYLINDRICAL AND TOROIDAL CONFIGURATIONS

This invention relates to tire-building apparatus and it is an object of the invention to provide a new or improved construction of such apparatus.

According to the invention there is provided tire-building apparatus comprising a radially expandable and contractable tire-building former having a support surface movable between a radially contracted condition, in which it is substantially cylindrical, and a radially expanded condition, in which it is substantially toroidal, said surface comprising the radially outer periphery of a plurality of sets of circumferentially spaced-apart support segments each of which sets comprises at least three segments with adjacent segments in each set being pivotally linked together and operating means being provided to move each set of segments radially outwardly or inwardly relative to the central longitudinal axis of the former.

Preferably three segments are provided in each set of segments, said three segments comprising a central segment disposed symmetrically about the midcircumferential plane of the former, and two lateral segments, each one of which is pivotally connected to an axial end of the central segment for free pivotal movement about said central segment, adjustable limit stops being provided to limit the axially inward degree of such pivotal movement of the lateral segments.

The operating means is preferably operably connected to the central link of each set of segments and comprises a pair of cooperating links associated with each set of segments, an axially inner end of each link being secured to the central segment and an axially outer end of each link being mounted for movement axially of the former with the links being so arranged that axial movement of the axially outer ends thereof produces a substantially radial movement of the axially inner ends thereof.

In one construction the axially inner ends of each pair of links are formed with a plurality of cooperating gear teeth set along an arcuate path on each link and the axially outer end of each link is pivotally connected to a nut engaged upon a common screw-threaded shaft provided with two screw-threaded portions, the pitches of each of which are equal but are in an opposed sense whereby rotation of the shaft causes symmetrical axial movement of the nuts along the shaft either towards or away from one another.

There may also be provided a plurality of support flanges arranged in circumferentially spaced-apart relationship adjacent the axially outer ends of the lateral segments, said flanges being movable radially inwardly and outwardly relative to the central longitudinal axis of the former and said flanges being detachably mounted upon a plurality of associated support bars extending axially of the former, one such flange being mounted adjacent each end of each associated bar. In this construction inflatable means are provided to act upon the support bars to move them in a radially outward direction, said inflatable means comprising an annular inflatable chamber located adjacent each end of the support bars and radially inwardly thereof.

One embodiment of the invention will now be described in more detail with reference to the accompanying drawings wherein:

FIGS. 1 to 4 are somewhat diagrammatic half-radial sections through the tire-building former showing cylindrical and toroidal configurations of the support segments and also showing how the former can accommodate and shape different carcass sizes.

FIG. 5 is a side elevation of a part of the former periphery showing the support segments.

FIG. 6 is an exploded radial section showing one set of support segments in the toroidal configuration and also showing parts of the operating links.

FIG. 7 is a sectional view on the line VII—VII of FIG. 6.

FIG. 8 is a partial side sectional view of the central support segments showing their means of attachment to the operating links.

FIG. 9 is a partial side sectional view of the central support segments and operating links in their retracted position in engagement with the support bars.

FIG. 10 is a radial view of one set of support segments in the toroidal configuration showing the provision of cover plates.

FIG. 11 is a plan view of two sets of support segments in the toroidal configuration showing the cover plates in more detail.

FIG. 12 is a side elevation of the support segments and cover plates.

FIG. 13 is a view on the line XIII—XIII of FIG. 10.

Figure 18:
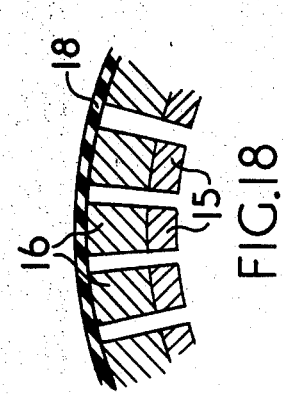
FIG. 18 is a partial sectional view of the line XVIII—XVIII of FIG. 16.

In this construction the tire-building former has a building surface which can be shaped from a substantially cylindrical configuration, for the building thereon of a tire carcass, to a toroidal configuration, for the addition to the shaped carcass of breaker and tread components to complete the building of the unvulcanized tire. The building support surface of the former comprises a plurality of circumferentially spaced-apart sets of support segments and FIGS. 1 to 4 show an assembly of one such set of three support segments, the central segment 10 of which is symmetrical about the midcircumferential plane of the building former and upon either side of which is located a lateral segment 11 pivotally connected thereto by means of a pivot pin 12. The extreme axially inward position of these lateral segments 11, as shown in FIGS. 1 and 3, relative to the central segments 10 can be adjusted by means of screw stops 13 which abut against the radially inner surface of the central segment 10.

An annular diaphragm 14 of elastomeric material such as rubber extends around the radially outer surfaces of all of the lateral and central segments, the axial edges of the diaphragm being secured to the axially outer extremities of the lateral segments 11 as shown in more detail in FIG. 6. The diaphragm 14 thus covers the whole of the building support surface of the former whilst the radially outer surface of the diaphragm itself forms a continuous surface upon which the elements of the tire can be assembled during the tire-building operation.

Located nearer to the central longitudinal axis of the building former and parallel thereto there are provided a plurality of elongated support bars 15, the radially outer surfaces of which define a cylindrical surface. Each such support bar 15 has located thereon symmetrically about the midcircumferential plane of the former, support flanges 16 which are themselves substantially L-shaped, the flanges being adjustably locatable along the support bars 15 by means of pin and socket connections 17 to obtain an axial spacing of the flanges dependent upon the width of the tire to be built upon the former. These L-shaped flanges are removable from the support bars and replaceable as desired by flanges having any suitable desired radial height dependent upon the diameter of the tire to be built, differing dimensions in the axial and radial directions being represented on FIGS. 1, 2 and 3, 4 respectively as A, B, C, D and A1, B1, C1, D1. The radially outermost surfaces of each set of support flanges 16 has an annular elastic diaphragm 18 (see FIGS. 16 and 17) secured thereto to provide a continuous building surface and which also acts to retract the flanges, and hence the support bars, radially inwardly.

As is clearly shown in FIGS. 1 to 4, both the lateral and central support segments have a curved radially outer surface and, referring to FIG. 5, the axially inner end of each lateral segment 11 is bifurcated at 19 for pivotal connection to the corresponding axial end of the associated central segment 10 by means of the pivot pin 12. Referring now to FIG. 6 it is seen that each axial edge of the rubber diaphragm 14 is formed with an integral annular T-shaped head 20 engaging within a part of the axial extremities of the lateral segments 11 and secured in position by means of clamping plates 21 and associated screws 22.

Radial movement of each set of support segments is effected by means of a pair of operating links 23, the axially inner extremities of which are shown in FIG. 6, and which are pivotally mounted by pivot pins 24 between two rectangular plates 25 having projections 26 engageable within a corresponding slot 27 in the central segment 10, the plates 25 being secured thereto by a suitable bolt 28 (see FIG. 8).

The ends of the operating links 23 at the positions at which they are located in between the plates 25 are formed with interengaging gear teeth 29 set along an arcuate path. On either side of the two plates 25 there are provided washers 30 of a large thickness through which the pivot pins 24 pass and in the fully retracted position of the segments these washers bear upon the radially outer surfaces of the cooperating support bars 15.

In order to present a more continuous radially outer building surface upon the support segments, suitably shaped, thin metal support plates 31 and 32 are secured to both the central and lateral segments respectively, the disposition and configuration of these plates being shown in more detail in FIGS. 10 to 15.

Figure 19:
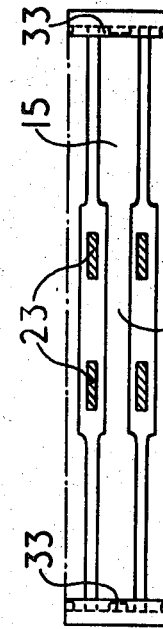
FIG. 19 is partially a plan view and part cross section on the line XIX—XIX of FIG. 16 showing the shape of the support bars.
Figure 14:
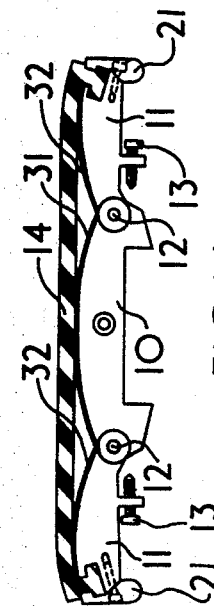
FIG. 14 is a radial view of one set of support segments and cover plates in the cylindrical configuration.
Figure 15:
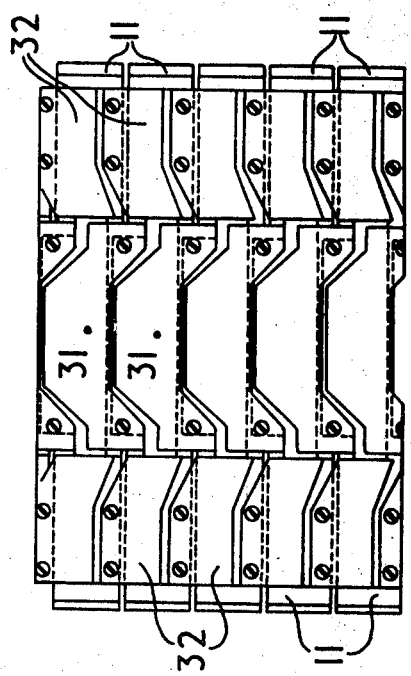
FIG. 15 is a plan view of a plurality of the sets of support segments showing the cover plates.
Figure 16:
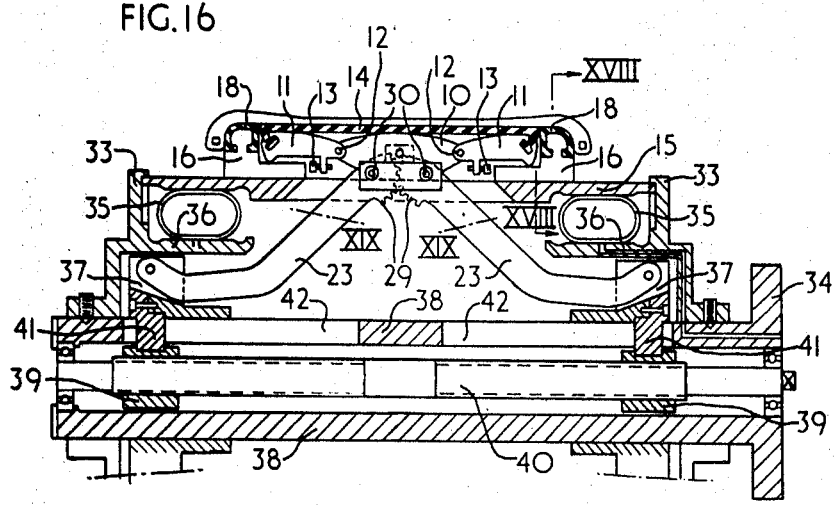
FIG. 16 is a half radial cross section of the apparatus showing the former in the cylindrical configuration.
Figure 17:
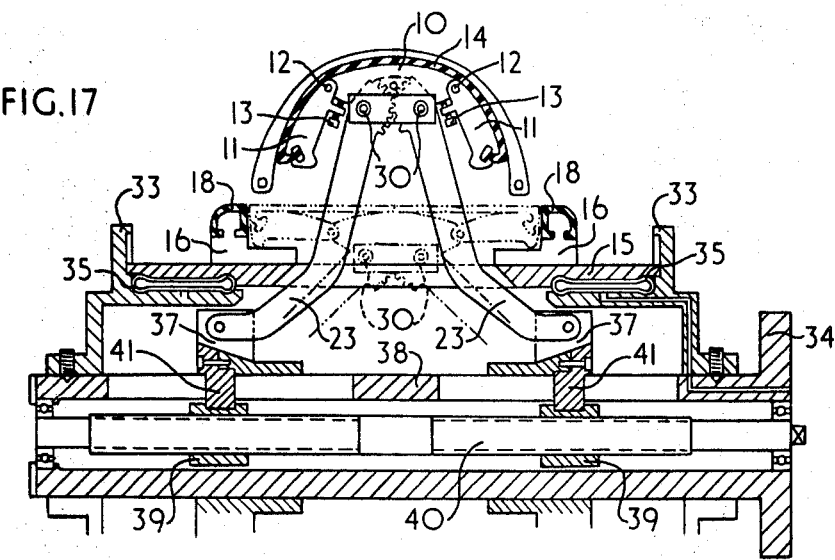
FIG. 17 is a similar half radial cross-sectional view showing the former in the toroidal configuration.

FIGS. 16 and 17 show in more detail the arrangement of the complete building former wherein it can be seen that the radially outward movement of the support bars 15 is limited by the engagement of their axially outer ends with cooperating flanged limit stops 33 secured to the hub 34 of the former. Radial movement of the support bars 15 is produced by inflation of two symmetrically located annular inflation chambers 35 located radially inwardly of the support bars and mounted upon annular support surface 36 rigid with the hub 34. A detail of the limit stops 33 is shown in FIG. 19 wherein it will be seen that each support bar 15 has a narrower central section 15a than its end sections whereby each pair of operating links 23 which effect movement of an associated set of support segments can be located between adjacent support bars.

The radial displacement of the support bars 15 has as a first object provision for the radial expansion or retraction of the L-shaped support flanges 16 according to whether the flanges are required to be in a carcass building position as shown in FIG. 16 or removed therefrom to allow shaping of the carcass to the toroidal configuration as shown in FIG. 17. A secondary object of the radial movement of the support bars is to assist in giving an initial radially outward movement to the operating links 23 by virtue of the radially outer surfaces of the support bars 15 lifting the links radially outwardly by engagement of such surfaces with the enlarged washers 30.

As will be seen in FIGS. 16 and 17, each operating link 23 is of curved elongated form, the axially outer extremity of which is pivotally mounted upon an annular element 37 slidable axially along a smooth shaft 38 of the former. Each such element 37 is connected to a nut 39 in screw-threaded engagement with a screwed central shaft 40 of the former by means of a key 41 passing through an axially extending slot 42 formed in the smooth shaft 38. The central screw-threaded shaft 40 is formed with two screw-threaded portions, the pitches of each of which are equal but in an opposed sense, whereby rotation of this shaft allows symmetrical axial approach and separation of the nuts 39 and thereby causes symmetrical radial movement of the axially inner ends of the operating links 23.

Figure 20:
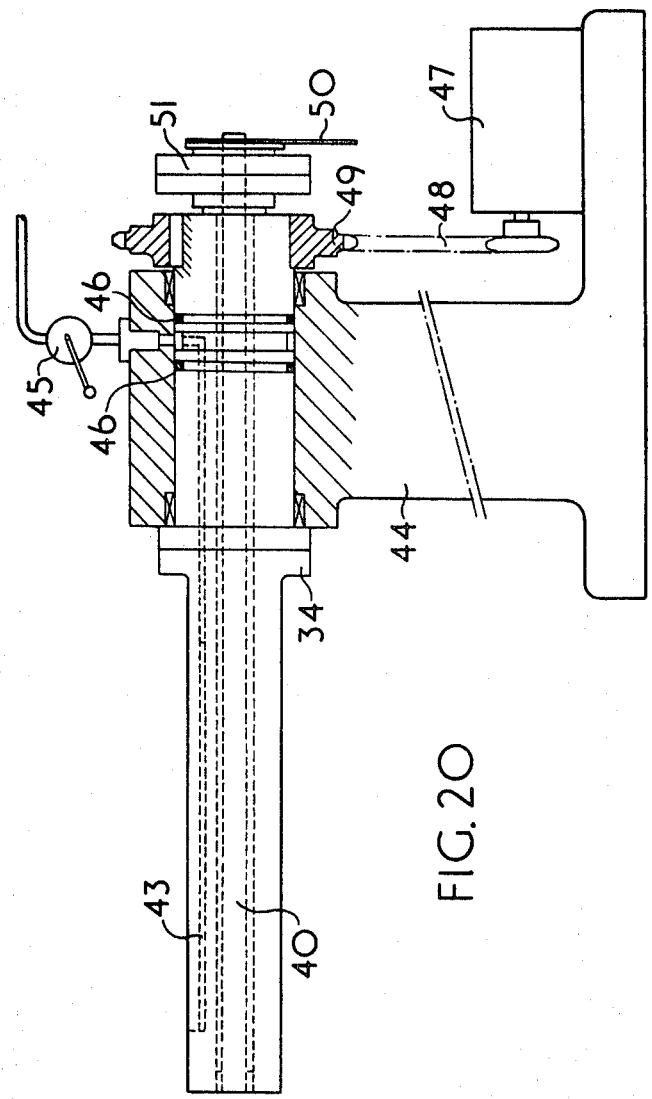
FIG. 20 is a side elevation showing the former main hub and axle and its principal control elements.

FIG. 20 shows a general arrangement of the principal control elements of the building former wherein can be seen the central screwed shaft 40 of the former located coaxially within the hub 34 and having an axially extending bore 43 formed therein for connection to the annular inflatable chambers 35. This bore 43 communicates, in a pedestal 44 of the former, with a suitable regulating valve 45 for pressurizing fluid, rotary sealing joints 46 being provided at that end of the hub 34 which is mounted in the pedestal 44.

Rotation of the hub 34 is effected by means of an electric motor 47 and a chain drive 48 to a toothed sprocket 49 mounted upon the hub whilst a further motor (not shown) connected by a further chain drive 50 and clutch mechanism 51 is provided to rotate the central screwed shaft 40 independently of the hub if desired. Thus when the hub is stationary and the clutch 51 engaged to drive the screwed shaft 40, the nuts 39 are run either away from or towards one another to effect movement of the operating links 23 as required and thus effect radial movement of the support segments from their cylindrical configuration to their toroidal configuration and vice versa.

The full shaping of the former from the cylindrical to the toroidal configuration is carried out as follows. The regulator valve 45 is opened to inflate the annular chambers 35 thereby moving the support bars 15 radially outwardly until they abut against their limit stops 33. At the same time the screwed shaft 40 is rotated to cause the operating links 23 to move towards one another, the initial movement of the links being assisted by the engagement of the support bars 15 with the washers 30 and the rotation of the shaft 40 is stopped when the support bars abut their limit stops, this position being shown in FIG. 16.

In this position the support segments are still in their cylindrical configuration and the radially outer surface thereof is coplanar with the radially outer surfaces of the L-shaped support flanges 16. In this configuration of the former the carcass is then built thereon and after completion the shaping to the full toroidal configuration is commenced as follows:

Firstly the chambers 35 are deflated to allow the support flanges 16 and bars 15 to retract radially inwardly away from the carcass under the elastic influence of the diaphragms 18. At the same time rotation of the screwed shaft 40 is recommenced to cause the operating links 23 to approach one another and move the support segments radially outwardly to expand the carcass to its toroidal configuration as shown in FIG. 17. As will be seen the central segments 10 act upon the crown region of the carcass whilst the lateral segments 11 act upon the shoulder and sidewall regions, the degree of shaping being limited by the degree to which the lateral segments 11 can swing axially inwardly about their pivot pins 12 before the adjustable screw stops 13 abut the central segments.

When the final diameter of the crown region of the carcass is accomplished, it is then possible to add the breaker and tread components of the tire to complete the tire-building operation. After this step the screwed shaft 40 is rotated in the opposite direction to withdraw the support segments radially inwardly. The segments return to their cylindrical configuration under the influence of the elastic diaphragm 14 and the lateral segments 11 are guided to this configuration by the engagement of the extremities of the clamping plates 21 with the L-shaped support flanges 16 until the position shown in chain dot lines in FIG. 17 is reached whereupon the shaped unvulcanized tire can be removed from the former.

Tire-building apparatus constructed in accordance with the invention greatly facilitates the building of radial ply tires wherein it is necessary that the built carcass is shaped to substantially the final desired diameter before the breaker and tread components of the tire are added. The provision of a tire support surface which is rigid in both the cylindrical and toroidal configurations of the former enables both the carcass plies of the breaker and tread components of the tire to be assembled accurately upon the former and obviates the possibility of accidental displacement of the cord angle of the carcass and breaker components.

I claim:

1. Tire-building apparatus comprising a radially expandable and contractable former which comprises a plurality of sets of rigid support segments circumferentially spaced apart around the periphery of the former, the outer surface of each segment being curved in a plane containing a radius and the axis of the former, the outer periphery of the segments forming a supporting surface and each set comprising at least three rigid segments, axially spaced-apart pivots connecting adjacent segments in each set together and operating means to move the sets of segments between a radially outer position in which the said radially outer periphery is a substantially toroidal supporting surface in which each set of segments has a horseshoe configuration and a radially inner position in which the said radially outer periphery is a substantially cylindrical supporting surface in which the segments of each set are arranged substantially in a straight line.

2. Tire-building apparatus as claimed in claim 1 wherein three segments are provided in each set of segments, said three segments comprising a central segment disposed symmetrically about the midcircumferential plane of the former and two lateral segments each one of which is pivotally connected to an axial end of the central segment.

3. Tire-building apparatus as claimed in claim 2 wherein the lateral segments in each set of segments are freely mounted for pivotal movement about the central segment, adjustable limit stops being provided to limit the axially inward degree of such pivotal movement of the lateral segments.

4. Tire-building apparatus as claimed in claim 2 wherein a plurality of cover plates are secured to the radially outer surfaces of some at least of the lateral and central segments to provide a substantially continuous peripheral surface circumferentially of the former.

5. Tire-building apparatus as claimed in claim 4 wherein an annular elastic diaphragm is secured to the segments radially outwardly of said cover plates to provide a continuous circumferential surface extending axially across the full overall width of each set of segments.

6. Tire-building apparatus as claimed in claim 2 wherein said operating means is operably connected to the central segments of each set.

7. Tire-building apparatus as claimed in claim 6 wherein said operating means comprises a pair of cooperating links associated with each set of segments, an axially inner end of each link being secured to the central segment and an axially outer end of each link being mounted for movement axially of the former and the links being so arranged that axial movement of the axially outer ends thereof produces a substantially radial movement of the axially inner ends.

8. Tire-building apparatus as claimed in claim 7 wherein the axially outer end of each link is pivotally connected to a nut engaged upon a common screw-threaded shaft provided with two screw-threaded portions, the pitches of each of which are equal but are in an opposed sense whereby rotation of the shaft causes symmetrical axial movement of the nuts along the shaft either towards or away from one another.

9. Tire-building apparatus as claimed in claim 7 wherein the axially inner ends of each pair of links are formed with a plurality of cooperating gear teeth set along an arcuate path of each link.

10. Tire-building apparatus as claimed in claim 2 wherein a plurality of support flanges are provided arranged in circumferentially spaced-apart relationship adjacent the axially outer ends of the lateral segments, said flanges being movable radially inwardly and outwardly relative to the central longitudinal axis of the former.

11. Tire-building apparatus as claimed in claim 10 wherein said flanges are detachably mounted upon a plurality of associated support bars extending axially of the former, one such flange being mounted adjacent each end of each associated bar.

12. Tire-building apparatus as claimed in claim 11 wherein an annular elastic diaphragm is secured around the radially outer peripheral surfaces of said flanges at each end of the former to urge the flanges radially inwardly.

13. Tire-building apparatus as claimed in claim 11 wherein inflatable means are provided to act upon the support bars to move them in a radially outward direction.

14. Tire-building apparatus as claimed in claim 13 wherein said inflatable means comprises an annular inflatable chamber located adjacent each end of the support bars radially inwardly thereof.

15. Tire-building apparatus as claimed in claim 11 wherein the support bars are engageable with the operating links whereby radially outward movement of the support bars assists, at least partially, in the radially outward movement of the axially inner ends of the links.

16. Tire-building apparatus as claimed in claim 11 wherein stops are provided to limit the degree of radially outward movement of the support bars.